June 7, 1949.  B. LADNER  2,472,665
LIQUID LEVEL SIGNAL DEVICE FOR TANKS
Filed May 23, 1947
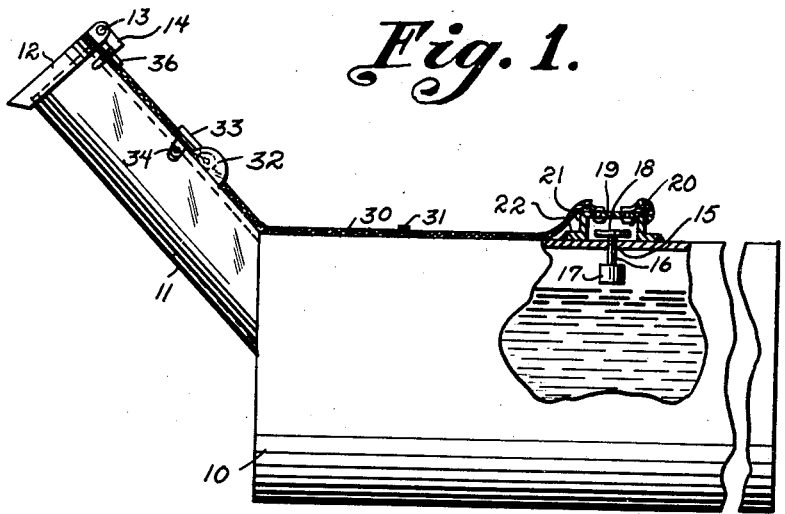
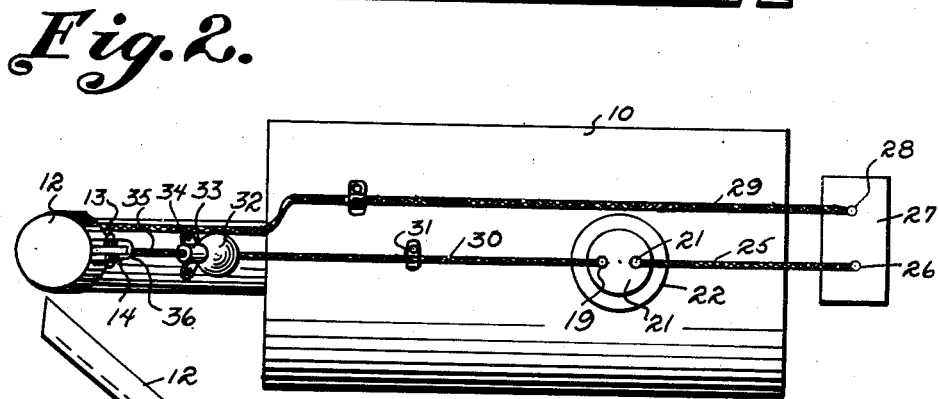
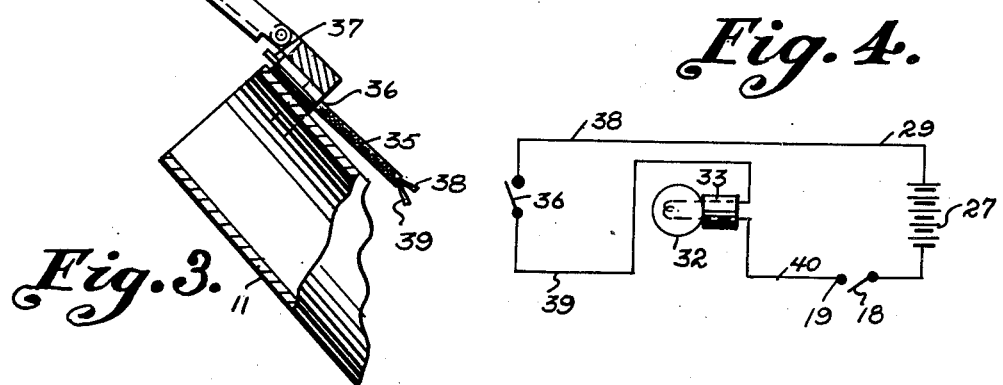
INVENTOR.
Bruce Ladner
BY *Victor J. Evans & Co.*
ATTORNEYS Patented June 7, 1949

2,472,665

UNITED STATES PATENT OFFICE 2,472,665

LIQUID LEVEL SIGNAL DEVICE FOR TANKS

Bruce Ladner, New Orleans, La.

Application May 23, 1947, Serial No. 750,012

2 Claims. (Cl. 177—311)

This invention relates to a device to prevent overflowing of tanks, and consequent spilling of liquids, and is particularly adapted for use with a vehicle gasoline tank.

A primary object of this invention is to provide of an electrical switching mechanism in association with a gasoline tank adapted to actuate a signal, such as a light or the like, when the fluid in the tank has reached a predetermined level, in order to advise the individual filling the tank that the capacity thereof has been substantially reached, in order that he may discontinue the filling thereof.

An additional object of the invention is to provide a device adapted for use in association with a gasoline tank having a hinged cap, provided with switches whereby the device is cut off when the hinged cap is closed.

Still another object of the invention is to provide a transparent filling tube to which the mechanism may be applied whereby the liquid level in the tank may be visible to the operator, in order to permit maximum filling thereof subsequent to the actuation of the indicator.

Still other objects will in part be obvious and in part be pointed out as the description of the invention proceeds, and taken in connection with the accompanying drawing wherein there is disclosed a preferred embodiment of this inventive concept.

In the drawing:

Figure 1 is a side view, partially in elevation and partially in section, disclosing the device of the instant invention as applied to a gasoline tank.

Figure 2 is a top plan view of the construction shown in Figure 1.

Figure 3 is a fragmentary side view, partially in section and partially in elevation, showing the end of the filling spout, on an enlarged scale.

Figure 4 is a schematic wiring diagram of the device.

Referring now to the drawings in detail there is shown at 10 a gasoline tank, of any desired conventional type, provided with an angled filling spout 11, preferably of transparent material in order that the fluid therein may be visible to the individual filling the tank. The spout 11 is provided with a cap 12, hingedly secured, as on a pivot 13 to a bracket 14 interiorly adjacent the mouth of the spout 11.

The top of the tank is provided with an aperture 15, through which extends a rod 16, preferably of insulating material, on the inner extremity of which is positioned a float member 17.

The top of the rod 16 is provided with a disc 18, of conductive material, adapted, when the float is raised to close a circuit between contact members 19 and 20 carried interiorly of a cap member 21, provided with a flange 22, the latter being secured to the top of the gas tank. From contact 20 a wire 25 leads to one terminal 26 of a battery 27, from the other terminal 28 of which a wire 29 leads to contact member 19. A second wire 30 leads also from contact 19 through a clip 31 secured to the top of the gas tank to an indicator bulb 32 provided with a socket 33 secured as by mounting flanges 34 to the spout 11.

As best shown in Figure 4 a cable 35 extends from the light socket 33 to a switch mechanism 36, including a button type actuating device 37, adapted to be contacted by the hinged cover 12 when the latter is closed, and moved to an open position. Cable 35 contains two wires 38 and 39, one of which provides a hot wire for the socket, and the other of which provides the ground wire, the arrangement being such that when the switch 36 is open the light 32 remains dark regardless of position of float 17 and its associated contact bridging disc 18.

This arrangement is best disclosed in the schematic wiring diagram shown in Figure 4.

As indicated by the wiring diagram the cable circuit contains two wires, one of which, 40 communicates directly with the light socket 33, while the other comprises a connection between the wires 39 and 29. It will thus be seen that the light 33 may be energized only when switches 18 and 36 are both closed. The foregoing switch 36 is closed only when cap 12 is closed, while switch 18 bridges contacts 18 and 19 only when the level of fluid in tank 10 is sufficiently high to elevate the float 17 to circuit closing position.

From the foregoing the operation of the device should now be readily understandable. Obviously when the cap 12 is open, the tank being low, or empty, button 37 is permitted to move outwardly, being biased to outward position by a spring interiorly of the switch mechanism in a known or conventional manner, whereupon the tank may be filled with fluid. As the level of fluid increases until the float is reached and raised the contacts 19 and 20 are bridged, which causes illumination of the light 32. Upon illumination of the light the operator is warned that the capacity of the tank is being substantially reached, and may continue to add gasoline to the tank, at a reduced rate, until such time as the level of the gasoline becomes visible in the transparent spout 11, indicating that the tank has been completely filled. Closing the cap 12 will cut the circuit to the light 32, and the device be rendered inoperative until such time as the cap 12 is opened again.

From the foregoing it will now be seen that there is herein provided a device which accomplishes all the objects of this invention, and others, including many advantages of great practical utility and commercial importance.

As many embodiments may be made of this inventive concept, and as many modifications may be in the embodiment hereinbefore shown and described, it is to be understood that all matter herein is to be interpreted merely as illustrative, and not in a limiting sense.

I claim:

1. In combination, a gasoline tank having a visible spout extending upwardly therefrom, a cover hinged to the outer end of the spout and adapted to be lifted to fill the gasoline tank, a push button switch associated with the spout and adapted to be engaged by the cover to cause it to be opened, a float switch device mounted on the top of the tank and having a float adapted to extend downwardly into the tank for engagement with the surface of the gasoline as the gasoline rises to a substantial elevation within the tank, switch terminals adapted to be bridged by the float, a light signal indicator mounted upon the visible spout to give an indication and to radiate light rays through the spout so that the level of the gasoline therein can be more readily seen as under dark conditions, an electric source and wires leading from the electric source to the switches and the light signal, whereby first a light signal will be given as the gasoline nearly fills the tank and then a visible view can be had of the gasoline within the spout to determine accurately the height of the gasoline within the tank with the aid of the light rays.

2. In combination, a tank having a visible interior spout extending therefrom, a cover removably connected to the end of the spout, a switch associated with the spout and adapted to be operated as the cover is lifted therefrom, a float switch device mounted on the tank and having a float adapted to extend into the tank for engagement with the surface of the contents as the same rises therein, a light signal indicator mounted upon the spout to give indication and to radiate light through the spout so that the level of the contents can be more readily viewed, an electric source and wires leading from the same to the switches and the light signal indicator, whereby first a light signal will be given as the contents approach the top of the tank and then a visible notation can be had of the contents within the spout to accurately determine the height of the contents within the tank.

BRUCE LADNER.

REFERENCES CITED

The following references are of record in the file of this patent:

UNITED STATES PATENTS

| Number | Name | Date |
|---|---|---|
| 1,744,064 | Zagarino et al. | Jan. 21, 1930 |
| 2,407,439 | Olson | Sept. 10, 1946 |